(12) United States Patent
Lemke

(10) Patent No.: US 9,367,674 B2
(45) Date of Patent: *Jun. 14, 2016

(54) MULTI MODE OPERATION USING USER INTERFACE LOCK

(71) Applicant: HEWLETT-PACKARD DEVELOPMENT COMPANY, L.P., Houston, TX (US)

(72) Inventor: Steven C Lemke, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/201,411

(22) Filed: Mar. 7, 2014

(65) Prior Publication Data

US 2014/0189825 A1 Jul. 3, 2014

Related U.S. Application Data

(63) Continuation of application No. 13/311,443, filed on Dec. 5, 2011, now Pat. No. 8,726,365.

(51) Int. Cl.
*G06F 21/00* (2013.01)
*G06F 21/31* (2013.01)
*G06F 21/62* (2013.01)
*G06F 21/74* (2013.01)

(52) U.S. Cl.
CPC .............. *G06F 21/31* (2013.01); *G06F 21/629* (2013.01); *G06F 21/74* (2013.01); *G06F 2221/2105* (2013.01); *G06F 2221/2141* (2013.01); *G06F 2221/2147* (2013.01); *G06F 2221/2149* (2013.01)

(58) Field of Classification Search
CPC ....... G06F 21/31; G06F 21/629; G06F 21/74; G06F 2221/2105; G06F 2221/2147; G06F 2221/2141; G06F 2221/2149
See application file for complete search history.

(56) References Cited

U.S. PATENT DOCUMENTS

| | | | |
|---|---|---|---|
| 6,922,843 B1 | 7/2005 | Herrington et al. | |
| 2005/0107114 A1* | 5/2005 | Ocock | H04W 8/183 455/550.1 |
| 2007/0016958 A1* | 1/2007 | Bodepudi et al. | 726/27 |
| 2012/0084734 A1* | 4/2012 | Wilairat | G06F 21/36 715/863 |
| 2012/0239242 A1 | 9/2012 | Uehara | |

* cited by examiner

*Primary Examiner* — William Goodchild
(74) *Attorney, Agent, or Firm* — HP Inc Patent Department

(57) ABSTRACT

A system and a method are disclosed for a computer implemented method to unlock a mobile computing device and access applications (including services) on a mobile computing device through a launcher. The configuration includes mapping one or more applications with a guest access code. The configuration receives, through a display screen of a mobile computing device, an access code, and determines whether the received access code corresponds with the guest access code. The configuration identifies the mapped applications corresponding to the guest access code and provides for display, on a screen of the mobile computing device, the identified applications.

17 Claims, 5 Drawing Sheets

MULTI MODE OPERATION USING USER INTERFACE LOCK

RELATED APPLICATIONS

This application is a Continuation of U.S. patent application Ser. No. 13/311,443, filed Dec. 5, 2011, entitled MULTI MODE OPERATION USING USER INTERFACE LOCK; the aforementioned application is hereby incorporated by reference in its entirety.

BACKGROUND

1. Field of Art

The disclosure generally relates to the field of security, and more particularly, to operating system security.

2. Description of Art

Operating systems of mobile devices (e.g., mobile telephones or smartphones) include security features such as a screen lock to prevent access to a system. Without security, access to system functions and applications can result in changes that are undesirable, for example, configuration changes, deletions and additions. With a screen lock in place, once a password is provided access to the system is fully available.

One problem with conventional screen lock configurations is an approach of all or nothing access to the system. If the password is properly provided access to all system functions and applications is available. Thus, any changes are possible to the system functions and applications, whether desired or not. If an incorrect password is provided no access is provided to system functions and applications, even if access to some limited functions and applications would be permissible.

Attempts to get around this all or nothing access have included creating separate user accounts, each with its own security and access rights to system functions and applications. However, these configurations require extensive administrative overhead with respect to set up and administration. Moreover, such configurations are inconvenient because they require each user to log out of an account, allow another use to log into an account, wait for that user to log out of the logged in account, and thereafter log back in with the initial account. The process for sharing a device requires significant management effort and time.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes a computer implemented system, method, and computer readable storage medium storing instructions thereon that provides access to applications (including services) on a mobile computing device through a launcher. In one embodiment, the configuration includes mapping one or more applications with a guest access code. The configuration receives, through a display screen of a mobile computing device, an access code, and determines whether the received access code corresponds with the guest access code. The configuration identifies the mapped applications corresponding to the guest access code and provides for display, on a screen of the mobile computing device, the identified applications.

It is noted that the configuration as disclosed allows for access to particular applications without requiring a system user or another guest user to "log off" the mobile computing device or without the need to shut down or "reboot" the mobile computing device. Hence, the configuration as disclosed achieves system access flexibility between users quickly and efficiently.

Example Mobile Computing Device

Figure 1:
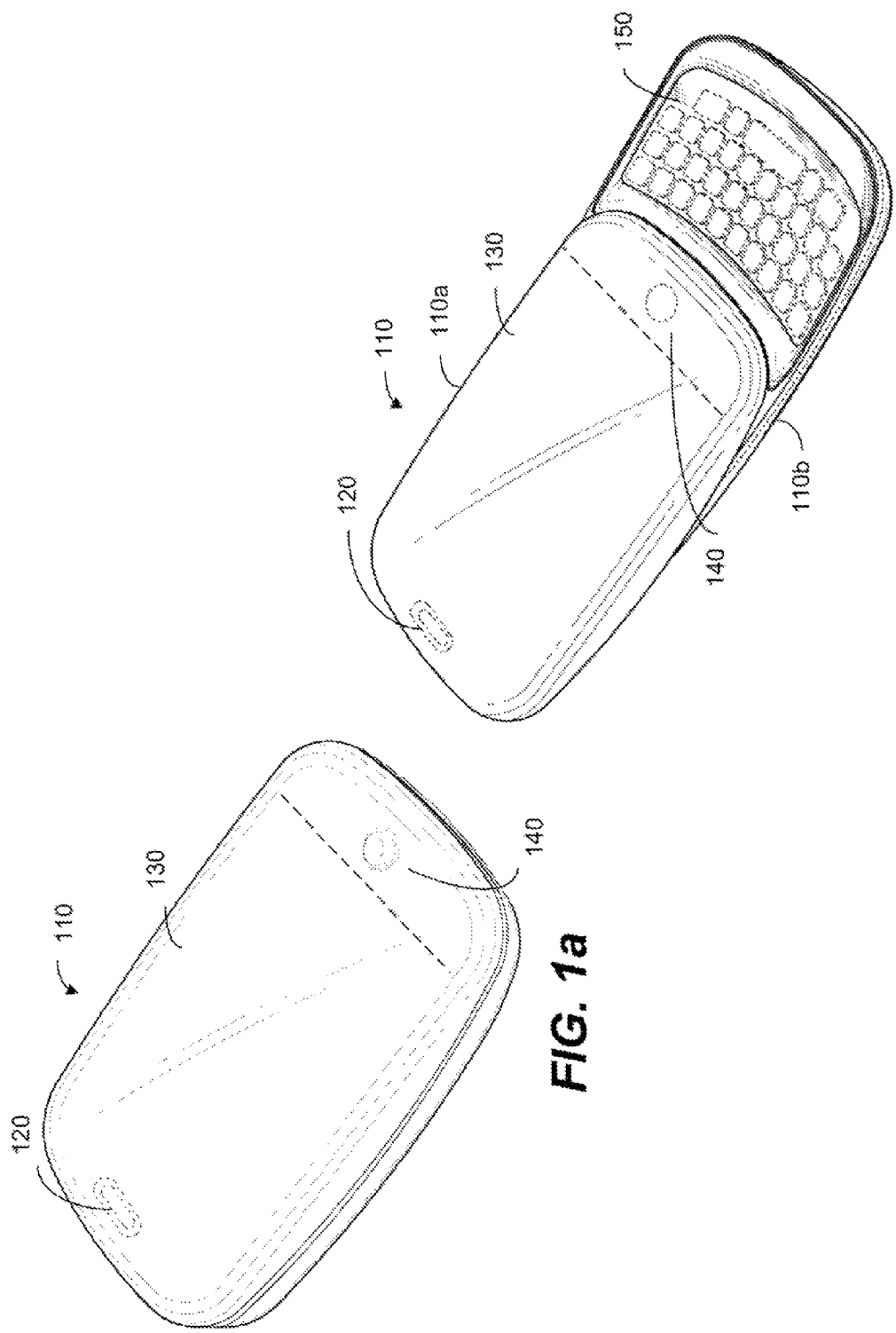
FIG. 1a illustrates one embodiment of a mobile computing device in a first positional state.
FIG. 1b illustrates one example embodiment of the mobile computing device in a second positional state.

Turning now to an example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, tablet, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
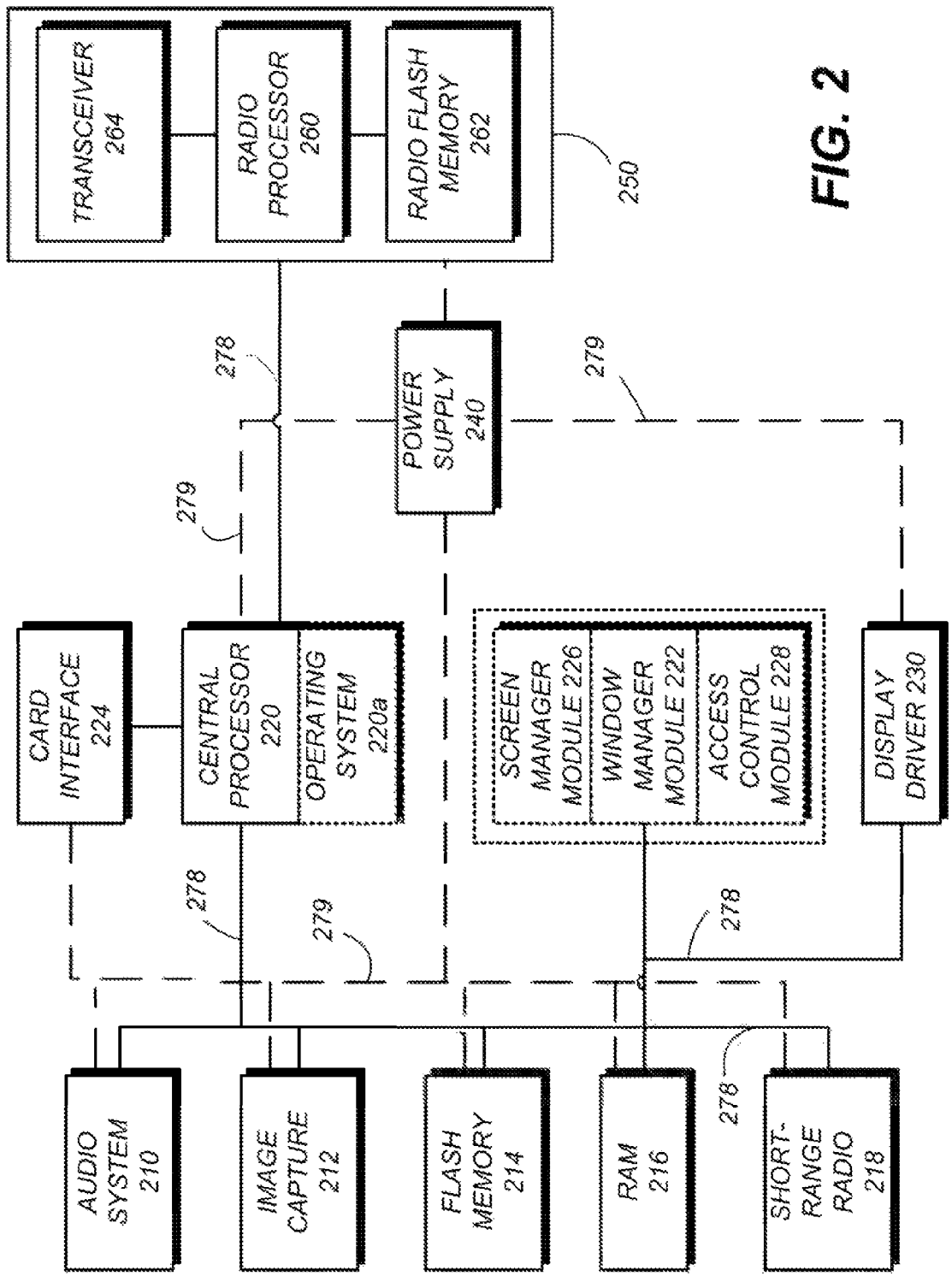
FIG. 2 illustrates one example embodiment of an architecture of a mobile computing device.

Next, referring next to FIG. 2, a block diagram illustrates one embodiment of an architecture of a mobile computing device 110 having telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM CORTEX, QUALCOMM SNAPDRAGON, SAMSUNG HUMMINGBIRD, APPLE A4 and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS PHONE, SYMBIAN OS, RIM BLACKBERRY OS, APPLE iOS, GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An access control module 228 comprises software that is, for example, integrated with the operating system or configured to be an application operational with the operating system. In some embodiments it may comprise firmware, for example, stored in the flash memory 214. The access control module 228 is configured to manage access to particular applications based on security that is controlled via a system access code screen, e.g., for entry of a personal identification number (PIN) code or gesture pattern entry. The access code security screen in one embodiment is the initial user interface displayed to a user of the mobile computing device 110 when the screen 130 of the mobile computing device 110 is activated. Upon entry of a system recognized access code, access is given to applications and services on the mobile computing device as is further described herein.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), Long Term Evolution (LTE), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Access Control Module

Figure 3:
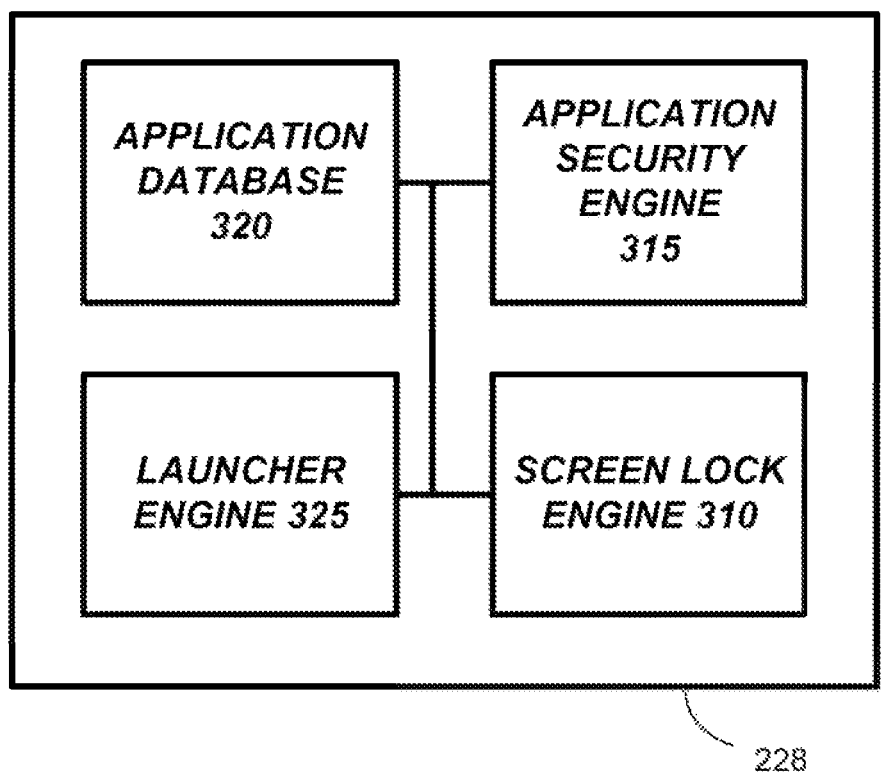
FIG. 3 illustrates one example embodiment of an access control module.

Turning now to FIG. 3, it illustrates one example embodiment of an access control module 228. The access control system 228 is configured to provide one of multiple predefined modes of a user interface based on a defined access code. In one example embodiment, the access control system includes a screen lock engine 310, a security module 315, an application database 320, and the launcher engine 325, which communicatively couple each other. The access control module 228 is configure to provide full system access or limited system access to applications (including services) on the mobile computing device 110 without having to require the user having full system access to "log off" or shut down the device in order to provide limited, or guest, access to others. It is noted that applications includes applications that can execute on the mobile computing device, e.g., apps, as well as services accessible through the mobile computing device, e.g., mobile telephony service provider access, WiFi connections, settings (or control panel), or transaction connections, e.g. radio frequency mobile payment.

The screen lock engine 310 is configured to generate a security user interface on the screen 130 of the mobile computing device. The generated screen is configured to requests an access code before any applications can be accessed on the mobile computing device 110. The screen lock engine also can be configured to allow for initialization of access codes. Initialization may include entry of an access code (e.g., a numeric or alphanumeric personal identification number (PIN) through a keypad rendered on the screen 130) for specific access. The specific access can be full system access, e.g., a full system access code (or a master access code) or it can be a guest access code, which provides access to applications on the mobile computing device 110, but less than full system access. One or more guess access codes can be initialized with the system.

The application security engine 315 provides a registry for the mobile computing device 110. The application security engine 315 includes a database, e.g., a table, a flat file or database file, stored in the flash memory 214. The application security engine 324 saves the initialized access code and maps it to the applications to which that access code is permitted access within the system. For full system access, the access code is mapped to all applications available (e.g., installed) in the mobile computing device 110. For a guest access code, each guess access code is mapped to specific applications as designated by the full system (or master) access owner, who typically is a primary user of the mobile computing device 110.

The application database 320 stores the applications available on the mobile computing device 110. The application database 320 can be stored in the flash memory 214 of the mobile computing device 110. Once the application is installed by the application database 320 it is registered with the application security engine 315. Once registered by the application security engine 315, the application can be associated with a private access code or a guest access code. In one embodiment, any applications available through the mobile computing device 110 can automatically be associated with full system access without need for any specific action by the primary user of the mobile computing device. As noted herein, the access code will dictate whether access to that application is permitted through the mobile computing device 110.

The launcher engine 325 is configured to provide for display on the screen 130 of the mobile computing device 110 a user interface that includes the applications corresponding to the access code received through the security user interface. It is noted that the user interface may be considered a launcher as from that user interface applications are launched (or started for execution).

With full system access, the launcher engine 325 provides for display one or more pages with the applications as organized by the primary user. The launcher engine 325 is instructed to provide for display applications corresponding to a particular guest access code. How the launcher engine 325 provides the application for display can be predetermined or defined by the primary user. In one embodiment, the launcher engine 325 is configured to arrange the display of the available applications (accessible applications) in the same position as the application would appear for the private access user. In this embodiment, the non-accessible applications may not be displayed at all or may be "grayed out" indicating that the guest does not have access to those. In another embodiment, the primary user may define a page in which the guest access applications are populated. The launcher engine 325 provides this page for display for the user with guest access. Thus, responsive to what is received as an access code, a particular user interface is rendered (a mode) that has a predefined set of applications for presented so that either less than the full system access is provided to guests while full system access is provided to the primary user.

Figure 4A:
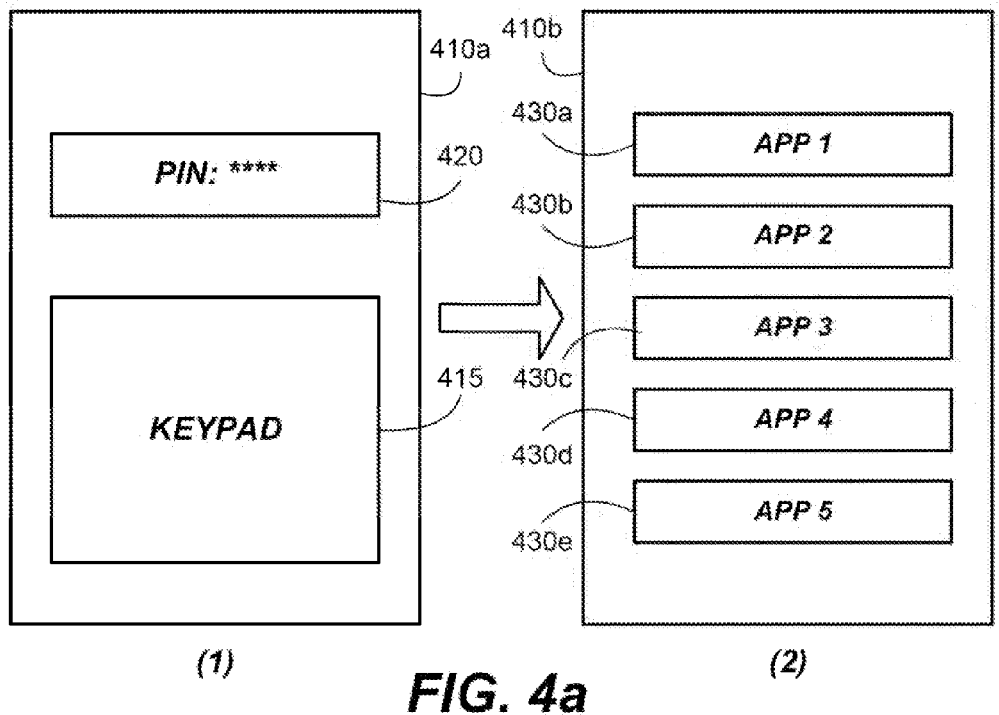
FIGS. 4a and 4b illustrate example embodiments of a security user interface, e.g., PIN lock screen) and subsequently displayed launcher screen.
Figure 4B:
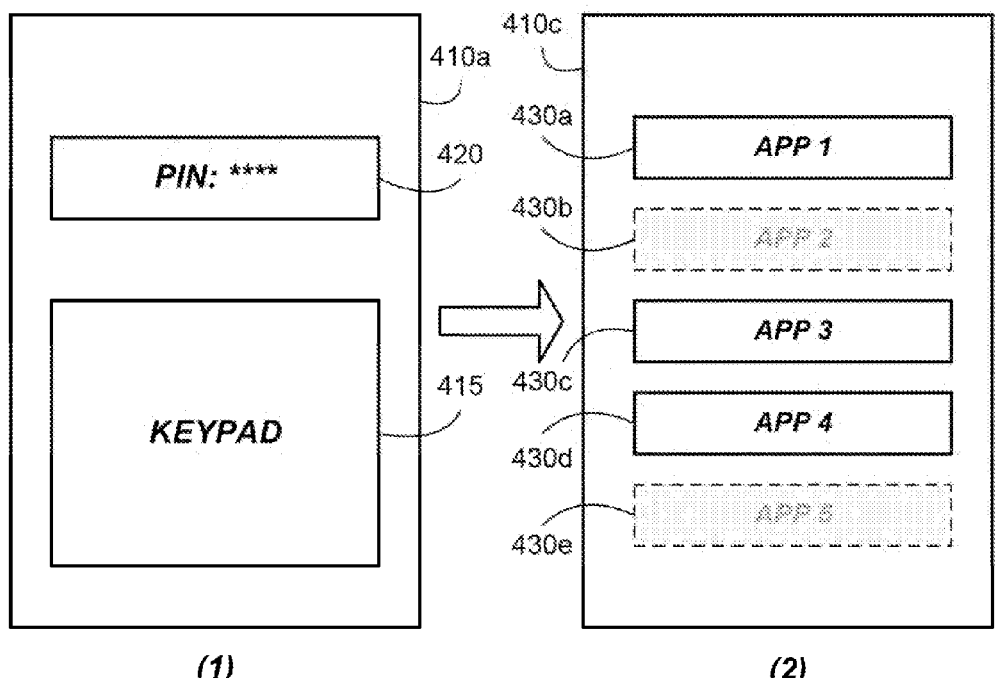

Referring next to FIGS. 4a and 4b, these illustrate an example embodiment of a security user interface (e.g., a PIN lock screen) and subsequently displayed launcher screen. In this example, both FIGS. 4a(1) and 4b(1) illustrate the security user interface 410 is provided (e.g., rendered) for display on a screen 130 of a mobile computing device 110. The security user interface 410a in this example includes a keypad area 420 and a personal identification number (PIN) area that are rendered by the security user interface 410a for display. The keypad area 420 is a touch enabled numeric keypad (e.g., 0-9 plus special characters such as * and #), although in alternate embodiment the keypad may be an alphanumeric keypad. The PIN area 420 renders for display the specific entry detected in the keypad area 415 or a special character, e.g., a '*', regardless for what is detected in the keypad area. It is noted in alternate embodiments, the security user interface may use a gesture pattern as an access code rather than a PIN number for an access code in order to unlock the user interface.

Next, FIGS. 4a(2) and 4b(2) illustrate a user interface provided for display in response to a received access code. In FIG. 4a(2), it is presume that the access code received through the security user interface 410a in FIG. 4a(1) is a private (or master) access code (or primary access code) corresponding to the primary user of the mobile computing device 110. In the configuration illustrated through FIG. 4a(1) the screen lock engine 310 of the access control module 228 provides through the launcher engine 325, in response to the primary user access code, a user interface 410b that includes access to all applications on the system, which in this example includes applications (or apps) 1-5. The apps 1-5 are user interface elements 430a-e that, when selected, cause the mobile computing device 110 to undertake some action.

Referring now to FIG. 4b(1), it is presumed that the access code entered through the keypad 415 is one for a guest access. In response to receiving the guest access code, the screen lock engine 310 of the access control module 228 provides for display through the launcher engine 325 a security user interface 410c as illustrated in FIG. 4b(2) that is different than the private access security user interface 410b. Specifically, the security user interface 410c here provides access to less than the full (i.e., a partial) set of applications as determined through the application security engine 315. In this example, the applications (or apps) that are accessible in response to receipt of the guest access code are apps 1, 3, and 4. Each of these accessible apps is represented through user interface elements 430a, 430c, 430d, that when selected cause the mobile computing device 130 to undertake some action.

For the applications that cannot be accessed, apps 1 and 5 in this example, the user interface elements 430b, 430e can be configured to either not display at all (i.e., user interface elements 430b, 430e are invisible in terms of presentation on the screen 130) or can be "grayed out." When the user interface elements are grayed out 430b, 430e on the security user interface 401c there is a faint representation of them on the screen 130, but any attempted interaction with those grayed out user interface elements 430b, 430e results in no action being taken by the mobile computing system 110. In either the invisible or grayed out configuration, the location of the user interface elements can be the same as set by the primary user for the private user interface or can be rearranged to another location.

Figure 5:
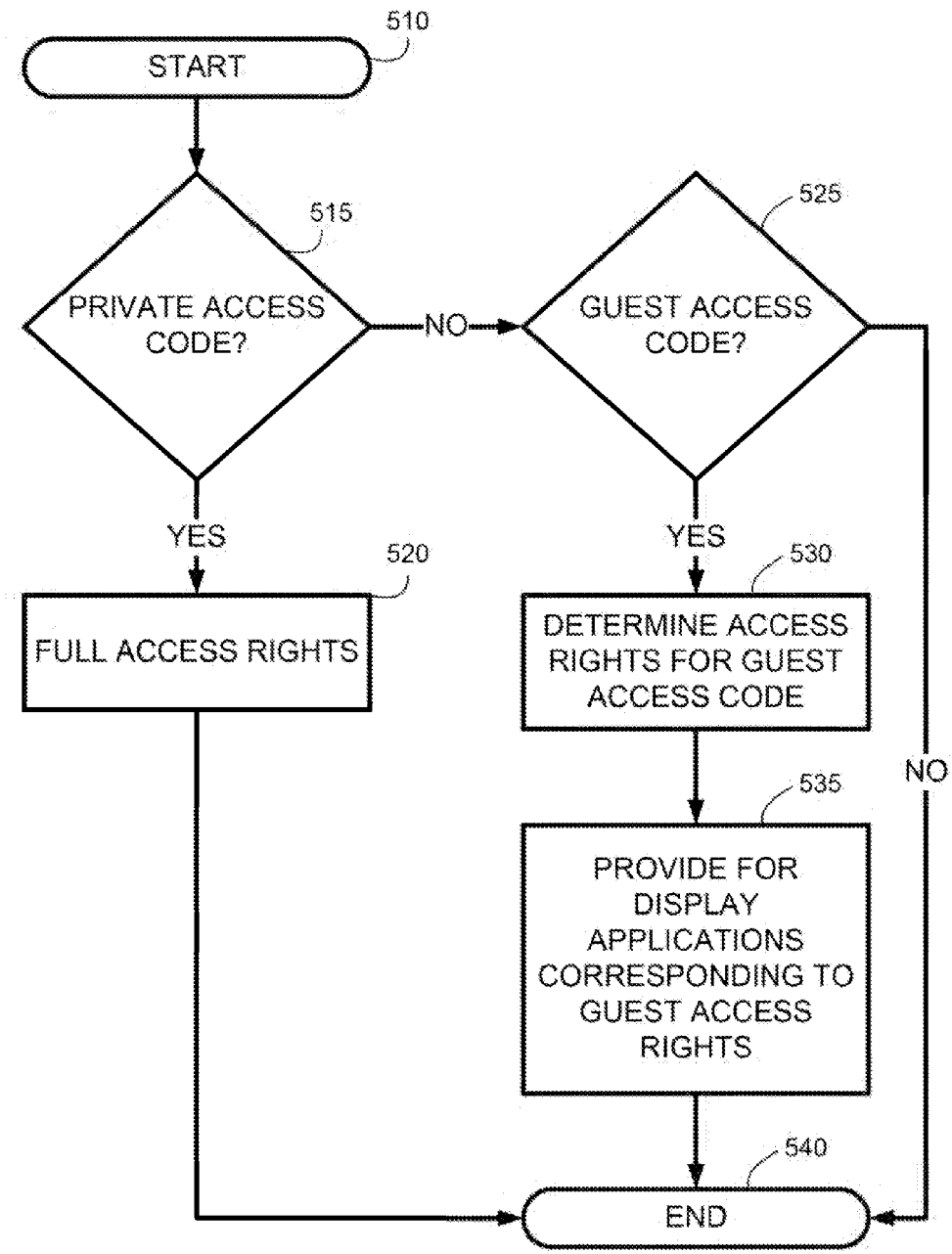
FIG. 5 illustrates an example process of an access control module.

Turning to FIG. 5, it illustrates an example process of the access control module 228. The process may be embodied as instructions stored within the flash memory 214 and/or RAM 216 and executable by the processor 220 of the mobile computing device 110. The process starts 510 and the screen lock engine 310 determines 515 whether a private access code is received by the mobile computing device 110. If a private access code is received, the launcher engine 325 of the access control module 228 provides for display a user interface that allows full access rights to application on the mobile computing display 110. The process then ends 540 when the guest user locks the user interface. By locking the user interface, a subsequent user of the mobile computing device 110 is presented the security user interface, e.g., 410a, in which an access code is provided. It is noted that the same user or any subsequent user must enter in an access code again before proceeding with interacting with any application of the mobile computing device 110. However, the prior user or the subsequent user is not required to log off or power down the mobile computing device 110 in order to access particular applications.

If the screen lock engine 310 determines 515 that the access code received is not a private access code, the screen lock engine 310 determines 525 whether the received code is a guest access code. If the received access code is not a guest access code, the process ends 540. If the received access code access code is determined 525 to be a guest access code by the screen lock engine 310, the application security engine 315 determines (or identifies) 530 the access rights to applications for that guest access code. The applications available for the guest access code are provided 535 for display as a guest user interface by the launcher engine 325 onto the screen 130 of the mobile computing device 110. The process then ends 540 when the guest user locks the user interface so that any subsequent user of the mobile computing device 110 is presented the security user interface, e.g., 410a. Accordingly, the same user or any subsequent user must enter in an access code before proceeding with interacting with the applications on the mobile computing device 110. However, the prior user or the subsequent user is not required to log off or power down the mobile computing device 110 in order to access particular applications.

The disclosed configuration allows for access to a limited subset of applications without requiring a primary user or another guest user to "log off" the mobile computing device 110 or without the need to shut down or "reboot" the mobile computing device 110. Rather, by using an access code, the system is above to provide for display applications that are specific to the access code so that a primary user may quickly share a single device with a guest user without having to expose sensitive applications or configurations to the guest user or create a specific user name and password for the guest user to access the applications on the mobile computing device 110. Hence, the configuration as disclosed achieves system access flexibility between users quickly and efficiently.

Upon reading this disclosure, those of skill in the art will appreciate still additional alternative structural and functional designs for a system and a process for multiple modes of presented user interfaces based on a received access code through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for providing access to applications on a mobile computing device, the method comprising:
   mapping different sets of applications to respective different access codes;
   receiving, through a user interface of the mobile computing device, an access code;
   in response to determining that the received access code is a first access code of the different access codes,
      displaying the first access code in a particular code display area of the user interface, and
      providing access to a first set of the different sets of applications, the first set mapped to the first access code;
   in response to determining that the received access code is a second access code of the different access codes,
      displaying the second access code in the particular code display area of the user interface, and
      providing access to a second set of the different sets of applications, the second set mapped to the second access code, the applications in the second set being different from the applications in the first set, wherein the applications in the first set is a subset less than all of the applications in the second set; and
   in response to determining that the received access code is the first access code, graying out user interface elements representing applications in the second set that are not part of the applications in the first set.

2. The method of claim 1, further comprising providing full system access to the applications on the mobile computing device in response to the received access code being the second access code.

3. The method of claim 1, further comprising prior to receiving the access code, locking a screen of the mobile computing device after usage by a prior user without shutting down or logging off an operating system of the mobile computing device.

4. The method of claim 1, further comprising providing for display a number keypad for entry of the access code.

5. The method of claim 1, wherein the second access code provides full access rights to the applications on the mobile computing device, and the first access code provides reduced access rights to the applications on the mobile computing device.

6. The method of claim 1, wherein the second access code corresponds to a primary user of the mobile computing device, and the first access code corresponds to a guest user of the mobile computing device.

7. A non-transitory computer readable storage medium storing instructions, the instructions when executed by a mobile computing device causing the mobile computing device to:
   map different sets of applications to respective different access codes;
   receive, in a single input area rendered in a user interface of the mobile computing device, an access code;
   in response to determining that the received access code received in the single input area is a first access code of the different access codes, provide access to a first set of the different sets of applications, the first set mapped to the first access code;
   in response to determining that the received access code received in the single input area is a second access code of the different access codes, provide access to a second set of the different sets of applications, the second set mapped to the second access code, the applications in the second set being different from the applications in the first set, wherein the applications in the first set is a subset less than all of the applications in the second set; and in response to determining that the received access code is the first access code, gray out user interface elements representing applications in the second set that are not part of the applications in the first set.

8. The computer readable storage medium of claim 7, further comprising instructions that cause the mobile computing device to provide full system access to applications on the mobile computing device in response to the received access code being the second access code.

9. The computer readable storage medium of claim 7, further comprising instructions that prior to the mobile computing device executing instructions to receive the access code, cause the mobile computing device to lock a screen of the mobile computing device after usage by a prior user without shutting down or logging off an operating system of the mobile computing device.

10. The computer readable storage medium of claim 7, wherein the single input area is a number keypad for entry of the access code.

11. The computer readable storage medium of claim 7, wherein in response to determining that the received access code received in the single input area is the first access code, cause display of the first access code in a single code display area of the user interface; and in response to determining that the received access code received in the single input area is the second access code, cause display of the second access code in the single code display area of the user interface.

12. A mobile computing device comprising:
an application database to store applications;
a screen lock engine to receive an access code in a single input area in a rendered user interface;
an application security engine to:
map different sets of the applications to respective different access codes,
in response to determining that the received access code received in the single input area is a first access code of the different access codes, provide access to a first set of the different sets of the applications, the first set mapped to the first access code,
in response to determining that the received access code received in the single input area is a second access code of the different access codes, provide access to a second set of the different sets of the applications, the second set mapped to the second access code, the applications in the second set being different from the applications in the first set, wherein the applications in the first set is a subset less than all of the applications in the second set, and
in response to determining that the received access code is the first access code, gray out user interface elements representing applications in the second set that are not part of the applications in the first set.

13. The system of claim 12, wherein the application security engine is further configured to provide full system access to the applications in the application database in response to the received access code being the second access code.

14. The system of claim 12, wherein the screen lock engine is further to lock a screen of the mobile computing device prior to receiving the access code and after usage by a prior user without shutting down or logging off an operating system of the mobile computing device.

15. The system of claim 12, wherein the single input area is a number keypad for entry of the access code.

16. The system of claim 12, wherein the second access code corresponds to a primary user of the mobile computing device, and the first access code corresponds to a guest user of the mobile computing device.

17. The system of claim 12, wherein in response to determining that the received access code received in the single input area is the first access code, the application security engine is to cause display of the first access code in a single code display area of the user interface; and in response to determining that the received access code received in the single input area is the second access code, the application security engine is to cause display of the second access code in the single code display area of the user interface.

* * * * *